(12) United States Patent
Barber

(10) Patent No.: US 11,359,606 B2
(45) Date of Patent: *Jun. 14, 2022

(54) WIND TURBINE WITH IMPROVED MAST ASSEMBLY

(71) Applicant: Gerald L. Barber, Greenville, SC (US)

(72) Inventor: Gerald L. Barber, Greenville, SC (US)

(*) Notice: Subject to any disclaimer, the term of this patent is extended or adjusted under 35 U.S.C. 154(b) by 4 days.

This patent is subject to a terminal disclaimer.

(21) Appl. No.: 17/062,812

(22) Filed: Oct. 5, 2020

(65) Prior Publication Data

US 2021/0025368 A1 Jan. 28, 2021

Related U.S. Application Data

(63) Continuation of application No. 15/146,320, filed on May 4, 2016, now Pat. No. 10,830,211, which is a
(Continued)

(51) Int. Cl.
*F03D 13/10* (2016.01)
*F03D 1/06* (2006.01)
(Continued)

(52) U.S. Cl.
CPC .......... *F03D 13/10* (2016.05); *F03D 1/0675* (2013.01); *F03D 13/25* (2016.05); *B63B 2035/446* (2013.01); *F05B 2240/91521* (2013.01); *F05B 2240/93* (2013.01); *F05B 2260/507* (2013.01); *Y02E 10/72* (2013.01); *Y02E 10/727* (2013.01); *Y02E 10/728* (2013.01); *Y02P 80/10* (2015.11)

(58) Field of Classification Search
CPC ........ B63B 2035/446; B66F 3/00; B66F 3/24; B66F 3/242; B66F 3/46; B66F 5/00; B66F 7/00; B66F 9/00; B66F 9/12; E04B 1/355; E04H 12/345; F03D 1/0675; F03D 13/10; F03D 13/20; F03D 13/25; F05B 2240/90; F05B 2240/91521; F05B 2260/507

USPC ........ 254/10 R, 47, 93 L, 93 R; 52/116, 117, 52/119

See application file for complete search history.

(56) References Cited

U.S. PATENT DOCUMENTS 2,887,191 A * 5/1959 Lovell ..................... E21B 15/00
52/115
3,715,852 A * 2/1973 Koga .................... E04H 12/345
52/745.18

(Continued)

*Primary Examiner* — Michael Lebentritt
*Assistant Examiner* — Julian B Getachew
(74) *Attorney, Agent, or Firm* — Kim and Lahey Law Firm, LLC; Seann P. Lahey; Douglas W. Kim

(57) ABSTRACT

A wind turbine including a mast assembly having an upper support structure hingably attached to a lower support structure wherein the mast assembly has an installation position and an operational position. A wind turbine wheel is mounted to the mast assembly having a circular rim disposed at its perimeter and having an axle structure. An electrical generator is supported by the mast assembly and configured to engage with the turbine wheel for generating electricity in response to the rotation of the turbine wheel. A plurality of hydraulic lifts are provided in contact with the upper support structure when the mast assembly is in the installation position and configured to transition the upper support from the installation position to the operational position and wherein at least one hydraulic lift loses contact with the upper support structure during the transition.

17 Claims, 13 Drawing Sheets

Related U.S. Application Data continuation-in-part of application No. 14/974,699, filed on Dec. 18, 2015, now Pat. No. 9,989,038.

(51) Int. Cl.
*F03D 13/25* (2016.01)
*B63B 35/44* (2006.01)

(56) References Cited

U.S. PATENT DOCUMENTS

| | | | | | |
|---|---|---|---|---|---|
| 3,778,940 | A | * | 12/1973 | Blecken | E21B 7/02 52/116 |
| 4,269,395 | A | * | 5/1981 | Newman | E21B 7/023 173/147 |
| 4,606,155 | A | * | 8/1986 | Bukovitz | E04H 12/34 52/116 |
| 6,955,025 | B2 | * | 10/2005 | Dehlsen | F03D 13/20 52/745.17 |
| 7,306,055 | B2 | * | 12/2007 | Barnes | E21B 7/02 175/122 |
| 8,341,918 | B2 | * | 1/2013 | Jolly | E04H 12/34 52/745.2 |
| 8,371,074 | B2 | * | 2/2013 | Grant | B66F 1/025 52/119 |
| 2011/0068729 | A1 | * | 3/2011 | Barber | H02K 7/1869 318/538 |

\* cited by examiner

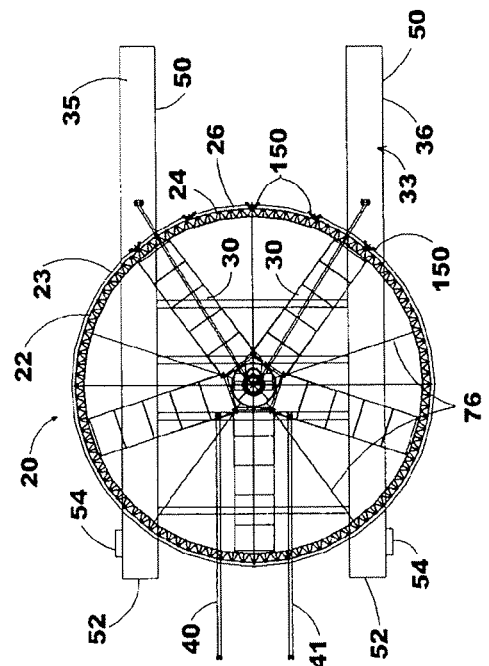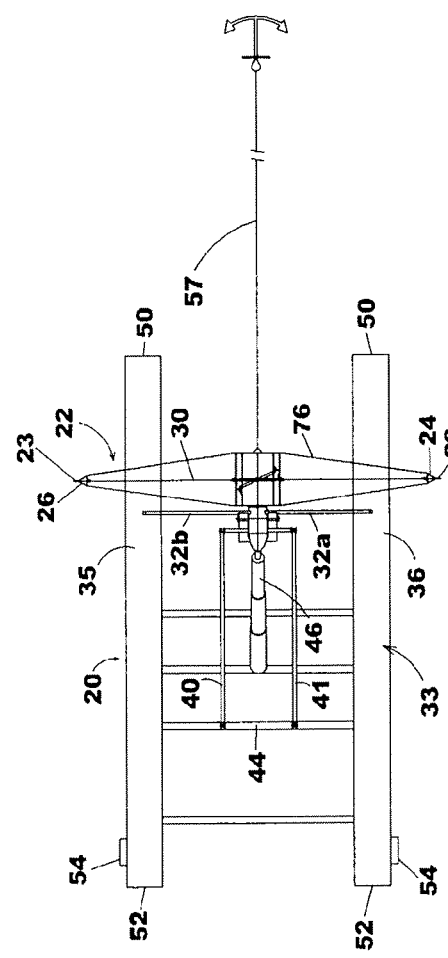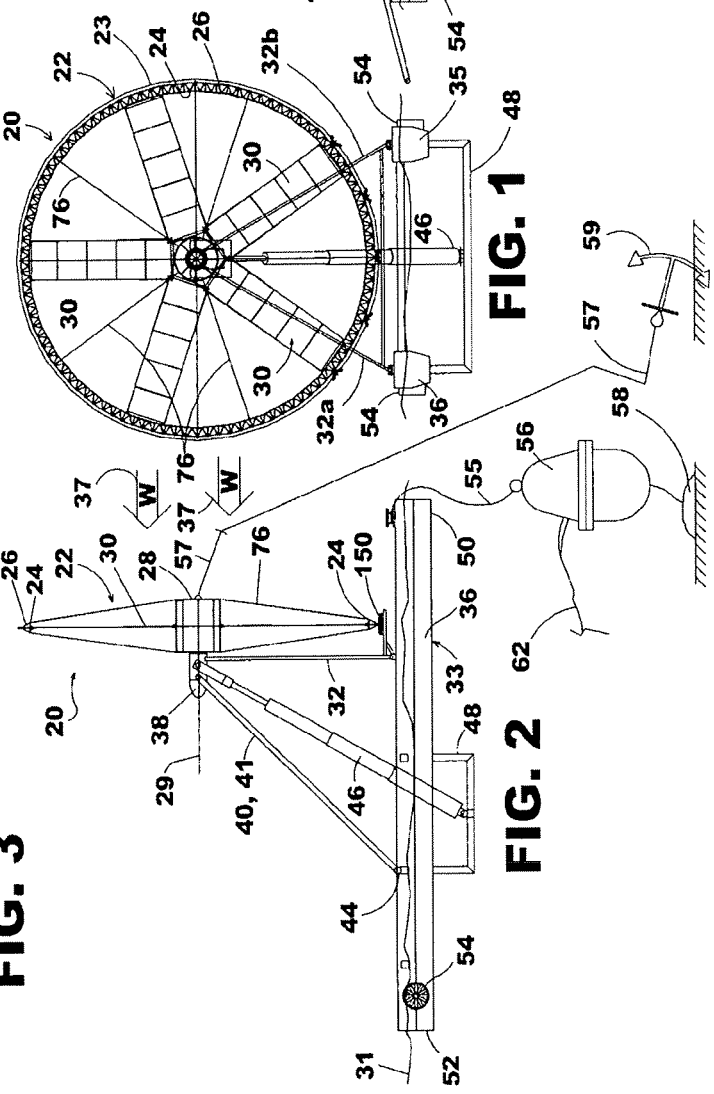

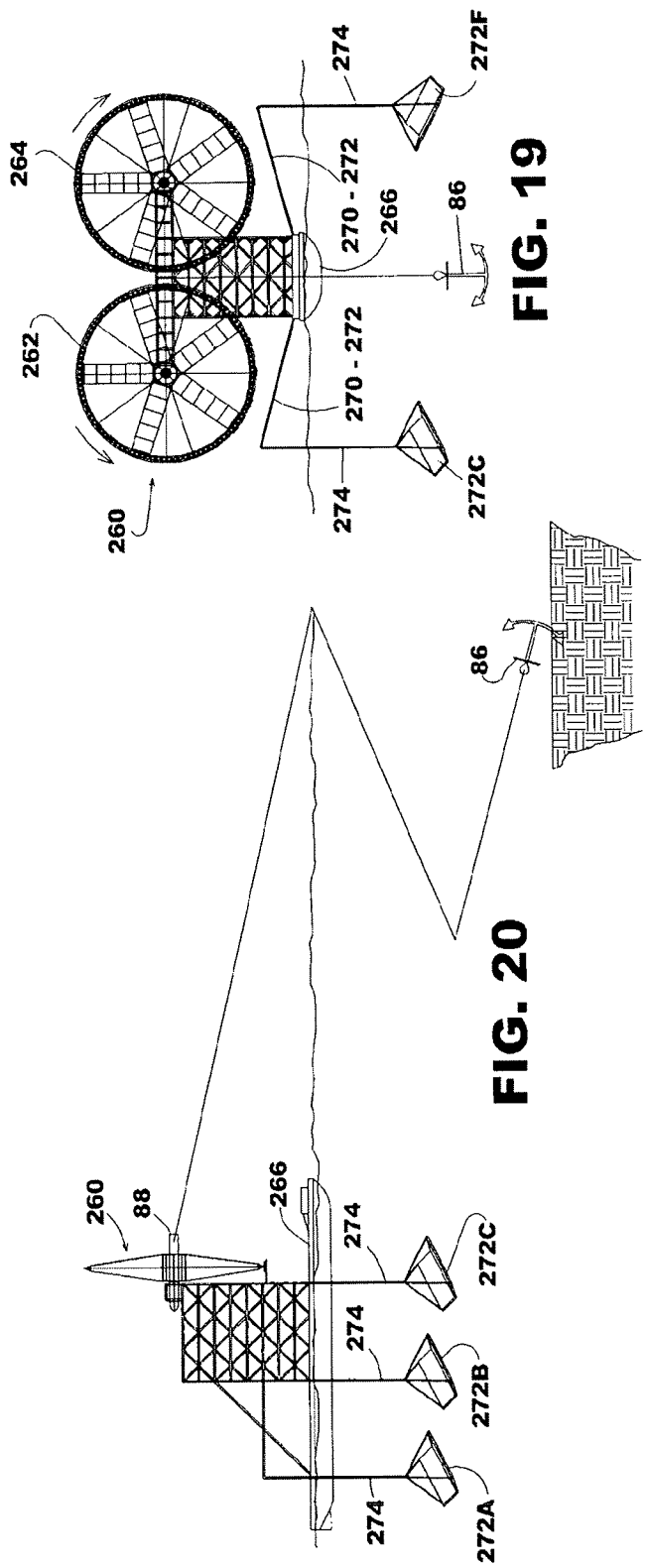
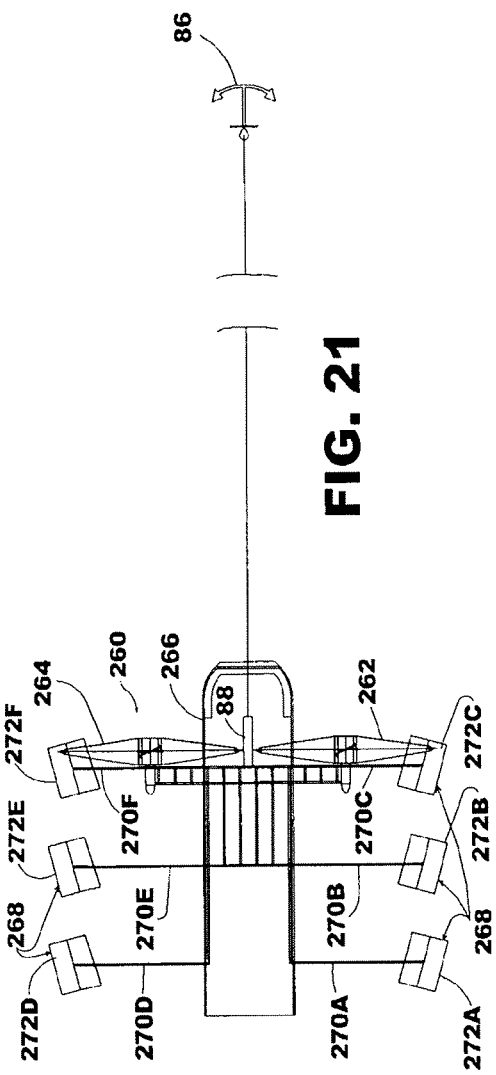

WIND TURBINE WITH IMPROVED MAST ASSEMBLY

FIELD OF THE INVENTION

This invention concerns an improved mast assembly for a wind turbine to improve the ability to construct and maintain a wind turbine and its support structure.

BACKGROUND OF THE INVENTION

Windmills have been used for many generations for the purpose of pumping water from the ground and for generating electricity. A basic advantage of the windmill is that it uses the power of atmospheric wind to rotate a wheel having radially extending blades. This rotary movement may be converted into various useful purposes. For example, wind turbines in the form of propellers mounted on towers have been placed in areas where steady winds are prevalent and the wind turbines are used to generate electricity.

The blades of the conventional wind turbines are very large and made of expensive rigid material and are constructed to have the blades extend radially from a central hub, with no extra support at the outer tips of the blades. The conventional wind turbine blades rotate at a high rate of revolutions and must withstand both the centrifugal forces generated by the fast revolution of the blades and the cantilever bending forces applied to the blades by the wind. Since the outer portions of the blades move at a very high velocity and are engaged by strong winds, the larger the blades the stronger they must be and the more expensive they become. Thus, there is a practical limit as to the length and width of the blades.

Another type of wind turbine is one that has sail wings constructed of fabric that are a substitute for the rigid blades of the conventional wind turbines described above. For example U.S. Pat. Nos. 4,330,714, 4,350,895, and 4,729,716 disclose wind turbines that use cloth "sails" that catch the wind. The blades of the wind turbine are formed of lighter weight material.

Another wind turbine type has rigid propellers that appear to be rigidly mounted to circular perimeter rims that support the outer ends of the propellers, as shown in U.S. Pat. Nos. 1,233,232 and 6,064,123.

Some of the wind turbines of the patents cited above are constructed with an outer rim that extends circumferentially about the turbine wheel. Rubber tires are placed in positions to engage the outer rim so as to rotate the rubber tires, with the driven rubber tires rotating the rotor of a generator. Thus, the rotation of the wind turbine is used to generate electricity. Other designs are shown in U.S. Pat. Nos. 8,109,727, 7,825,532, 8,134,251, 8,164,212, 8,178,993, 8,487,471, 8,174,142, 8,258,645, 8,373,298, 8,466,577 and United States Patent Application Publications 2014/0271183 and 2014/0265344, all incorporated by reference.

Prior art wind turbines are mounted on upright towers and the towers are supported at their bases by mounting the towers in the earth or on some other stable platform. When the wind turbine is in operation with an oncoming brisk wind engaging the angled blades of the turbine wheel, a significant longitudinal force is transmitted from the blades of the turbine wheel to the upper portion of the tower, tending to tip the tower. This horizontal tipping force usually is significantly greater than the circumferential wind force engaging the angled surfaces of the blades of the turbine wheel and causing the rotation of the turbine wheel. This longitudinal force requires the tower for a wind turbine to be very strong to avoid tipping over.

While wind turbines have found use in open land areas where steady winds are prevalent, the land areas most suitable for catching the wind on wind turbine propeller blades usually are remote from the areas of great need of electrical power. Therefore, there is a requirement that electrical power be transmitted through conductive cables for long distances to the areas of need.

Winds generated over large bodies of water, particularly over an ocean, are not confronted with mountains, buildings, and the vegetation of the land masses that tend to slow the velocity of winds. The turbulence of wind usually is less over water than over land. This may be because there is a greater temperature variance between different altitudes over land than over a body of water, apparently because sunlight is absorbed further into water than into land, and for comparable conditions, the surfaces of land become warmer and radiate more heat than the surfaces of water.

One disadvantage is that the wind turbine, by its nature is a large structure that is position a considerable distance off the ground. This present physical and logistical challenges during the initial constructions as well as during the maintenance of the wind turbine and its support structure. Construction of the wind turbine horizontally where it can later be erected if challenging give the need for cranes and other very large lifting equipment to hoist and secure the wind turbine to its support structure. This is especially true for installation locations such as off-shore, remote locations, islands, and the like.

Therefore, it would advantageous to have a support structure that would allow the wind turbine to be initially constructed in a horizontal disposition and then raised to the support structure without the need for complicated or heavy cranes.

It would also be advantageous to have a support structure that would allow the wind turbine to be raised and lowered for maintenance without the need for a separate crane of other hoisting assembly.

SUMMARY OF THE DISCLOSURE

Briefly described, this disclosure concerns a wind turbine assembly for generating electricity that includes a support, a turbine wheel rotatably mounted on the support about a longitudinally extending central axis, the turbine wheel including a circular rim concentric with and rotatable about the central axis, and an electrical generator in a driven relationship with the turbine wheel.

In one embodiment, a wind driven turbine wheel may be mounted on a floatable support, capable of floating on the surface of a large body of water. The floatable support may include a lateral thruster for turning the wind turbine into the oncoming atmospheric wind.

Another novel feature of the structure may be a wind turbine mounted on a floatable support, with an anchor tied to the wind turbine at a position high enough to resist tipping forces applied by atmospheric wind to the turbine.

One of the wind turbine assemblies disclosed herein may include a floatable support, a pair of wind turbines mounted side-by-side on the floatable support and sail wings of one wind turbine each having a pitch opposite to the pitch of the sail wings of the other wind turbine to balance the gyroscopic effects of the wind turbines.

Another feature of a wind turbine assembly may include an anchor tied to the bow of a floatable support and a lateral thruster for moving the stern of the floatable support for turning the wind turbine into the atmospheric wind.

Another feature of a wind turbine assembly may include one or more wind turbines mounted on a floatable support with an anchor tied directly to the wind turbines to deter tilting of the wind turbines in response to strong wind directed into the wind turbines.

Also, the wind turbine may include sail wings formed of fiberglass or other relatively flexible material, with shape control means carried by the turbine wheel for rotating at least one of the ends of the sail wings about the longitudinal axis of the sail wings to form a pitch or twist in the sail wings.

The wind turbine assembly may include a floatable support without riggers supporting the floatable support in an upright attitude. Turbine anchors may be attached to the wind turbines above the level of the floatable support and arranged to resist the longitudinal wind forces applied to the wind turbines.

Other features and advantages of the structure and process disclosed herein may be understood from the following specification and accompanying drawings.

BRIEF DESCRIPTION OF THE DRAWINGS

FIG. 1 is a front elevation view of a floating wind turbine, showing the turbine wheel in its upright position.

FIG. 2 is a side elevation view of the wind turbine of FIG. 1.

FIG. 3 is a top view of the wind turbine of FIGS. 1 and 2.

FIG. 4 is a top view of the wind turbine of FIG. 1, but showing the turbine wheel tilted in its inoperative position.

FIG. 5 is a side view of the wind turbine of FIG. 4, showing the turbine wheel tilted in its inoperative position.

FIG. 19 is a front elevation view of a double wind turbine, having a pair of wind turbine wheels mounted on a common floatable support, and out riggers that stabilize the floatable support.

FIG. 20 is a side elevation view of the double wind turbine of FIG. 19.

FIG. 21 is a top view of the double wind turbine of FIGS. 19 and 20.

DETAILED DESCRIPTION

Figure 6:
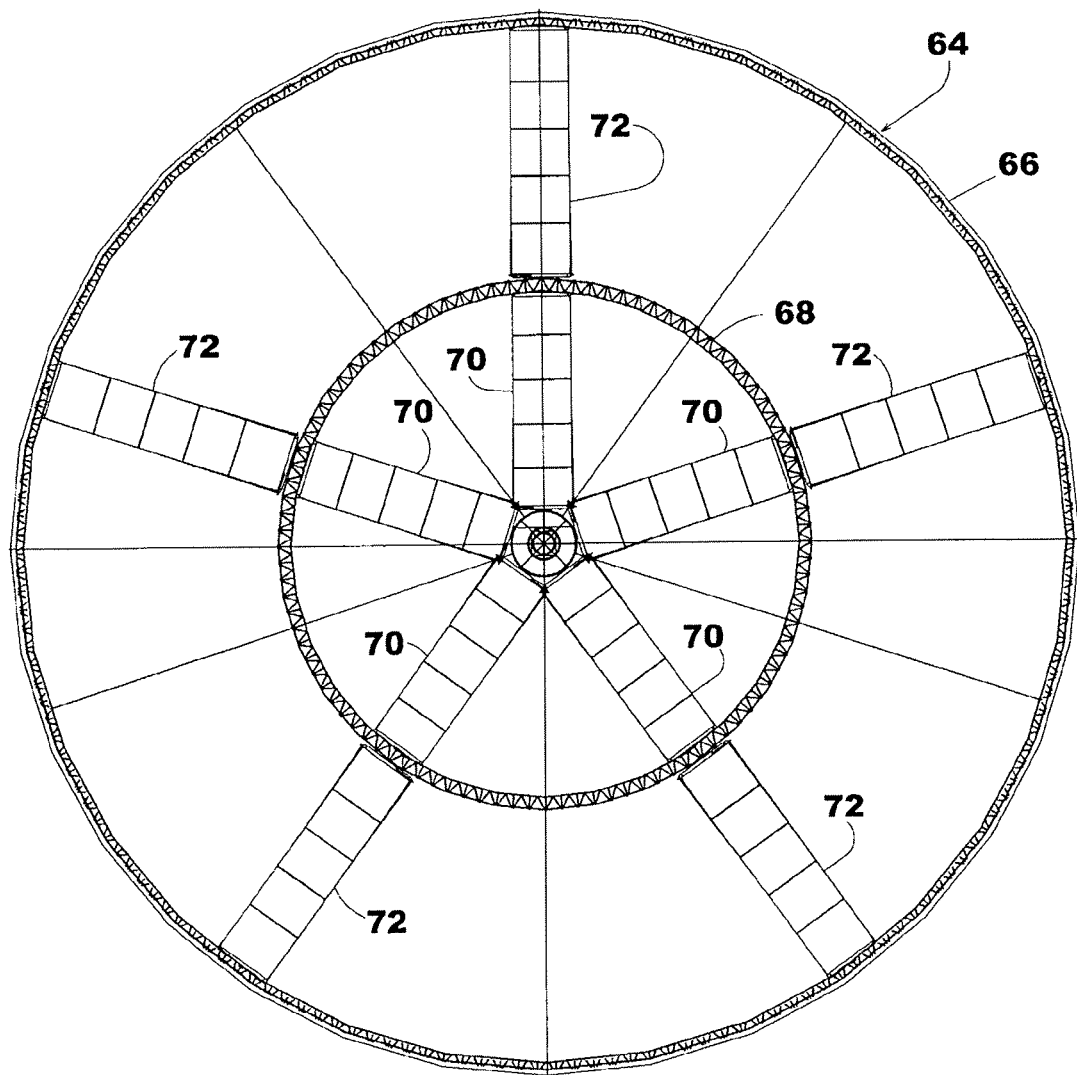
FIG. 6 is a front elevation view of a modified wind turbine wheel, similar to the turbine wheels of FIGS. 1-5, but including an intermediate circular rim that is concentric with the outer circular perimeter rim, with inner sail wings supported between the axle structure and the intermediate support rim and outer sail wings supported between the intermediate support rim and the outer circular perimeter rim.

Referring now in more detail to the drawings in which like numerals indicate like parts throughout the several views, FIG. 1 shows a wind turbine 20 that is designed for catching the wind and rotating for the purpose of generating electricity. The wind turbine includes a turbine wheel 22 having an outer perimeter 23 formed by a series of angle braces 24 and an outer perimeter circular rim 26 that extends continuously about the turbine wheel. The outer perimeter circular rim may be formed of arcuate segments, and as explained in more detail hereinafter, the perimeter rim may function as the rotor of an electrical generator, or may function to drive a rotor of an electrical generator.

An axle structure 28 is at the center of the turbine wheel 22 and a plurality of sail wing assemblies 30 are mounted to the axle structure 28 and extend radially toward the angle braces 24 that form the perimeter of the turbine wheel. The turbine wheel rotates about the central axis 29.

The wind turbine assembly may be used on a body of water such as an ocean or lake 31 where the atmospheric wind 37 usually is of higher velocity, less turbulent and more predictable than the atmospheric wind over a land mass. When used on water, the turbine assembly may include a floatable support 33, such as a pontoon boat, barge or other suitable floatable support. The floatable support of FIGS. 1-5 is a pontoon boat having parallel pontoons 35 and 36. The wind turbine assemblies of FIGS. 1-5 include a foldable tower assembly 32 that includes a pair of tower arms 32A and 32B that are connected at their lower end portions to pontoons 36 and 35, respectively, and converging upwardly toward one another in a vertical plane to an upward apex that is in support of the bearing housing 38 at the axial structure 28 of the turbine wheel 22. The tower arms 32A and 32B are foldable about their lower ends to an attitude more horizontal, as shown in FIG. 5, so that the turbine wheel 22 moves more toward a supine position over the pontoons 35 and 36.

Stabilizing arms 40 and 41 are parallel to one another and sloped upwardly from the pontoon boat and are pivotally mounted to the bearing housing 38. The lower ends of the stabilizing arms 40 and 41 are releaseably connected to the cross frames of the pontoon boat, such as cross frame 44. When the turbine wheel 22 is to be tilted toward its supine position, the lower ends of the stabilizing arms 40 and 41 are detached from the cross frame member 44, allowing the turbine wheel 22 to tilt toward its supine position.

Hydraulic cylinder 46 is mounted at its lower end to depending framework 48 and at its upper end to the bearing housing 38. When the hydraulic cylinder 46 is distended, it holds the foldable tower assembly 32 in its upright attitude, allowing the stabilizing arms 40 and 41 to be connected at their lower ends to the cross frame member 44, thereby holding the turbine wheel 22 in its upright position. However, when the stabilizing arms 40 and 41 are disconnected at their lower ends from the cross frame member 44, the hydraulic cylinder 46 may be retracted, causing the turbine wheel 22 to tilt toward its supine position as shown in FIG. 5.

The foldable support may be used when transporting the wind turbine assembly to and from its site of operation, and for maintenance or repair. The wind turbine also may be supported on a non-foldable, more permanent upright tower carried by the floatable support, if desired.

The floatable support 33 of the wind turbine assembly 20 is considered to have a bow at 50 and a stern at 52. The turbine wheel 22 faces the bow 50. Lateral thrusters 54 may be mounted to the pontoons 35 and 36, typically at the stern 52 of the pontoons. The bow 50 may be connected by a first anchor line 55 or other appropriate means to an anchor such as to an anchored buoy 56 that functions as an anchor. The anchor 56 may comprise a pier, anchor, dock, or other means that generally is not movable from a designated position in or adjacent a body of water. The anchor line 55 may be a chain, cable, twisted hemp rope or other conventional means or combination of these and other connectors for connecting the floatable support to an anchor.

When the atmospheric wind 37 moves against the wind turbine assembly 20, the anchor (buoy, pier, etc.) to which the wind turbine assembly is tied stabilizes the bow 50 of the floatable support, usually causing the wind turbine assembly to move downwind of its anchor. In order to assure that the turbine wheel 22 faces the oncoming atmospheric wind, the lateral thrusters 54 shown in FIGS. 1-5 and 11 may be actuated in response to a wind direction finder (not shown), tending to turn the floatable support and, therefore, the turbine wheel more directly into the atmospheric wind.

Figure 11:
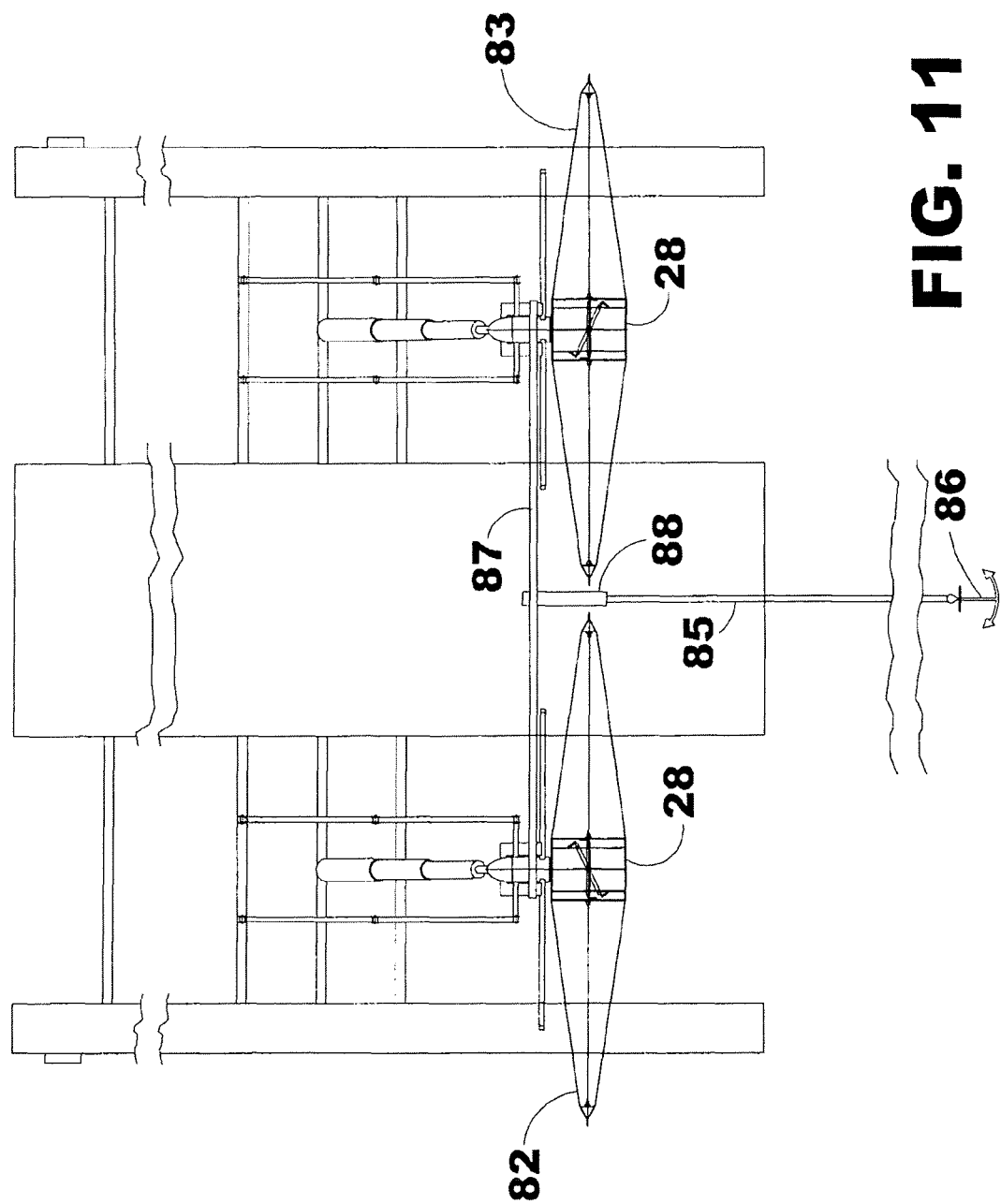
FIG. 11 is a top view of the wind turbine of FIG. 10.

The lateral thruster 54 of FIG. 11 typically is mounted to the stern 52 of the floatable support 33, as shown in FIGS. 1-5, so that the anchor 56, 60, etc. stabilizes the bow of the floatable support while the lateral thrusters tend to swing the stern in alignment with the bow and atmospheric wind. This assures that the turbine wheel 22 more directly faces the oncoming atmospheric wind, taking advantage of the wind movement through the sail wing assemblies 30, causing efficient rotation of the turbine wheel 22. Lateral thrusters, sometimes known as "bow thrusters" are conventional in the art and may be found at Mabru Thrusters, Miami, Fla. 33142.

As shown in FIGS. 2 and 5, the anchor, such as a buoy 56, pier or other stationary docking point 58 for the wind turbine assembly includes an electrical connection (not shown) to the electrical generator 150 of the wind turbine assembly 20 and an electrical conductor 62 to a receiver that may be on an adjacent land mass for transmitting the electrical power generated by the wind turbine assembly.

The turbine wheel and its floatable support may be very large in length, width and height. Because of the uncontrolled velocity of the atmospheric wind and because of the large height and other large size dimensions of the wind turbine assembly, it is desirable to construct the wind turbine assembly so that it resists capsizing or tilting or other deviation from facing the atmospheric wind and is desirable to minimize the application of longitudinal and other horizontal forces to the tower 32 and its stabilizing arms 40 and 41. As shown in FIG. 2, in addition or alternatively, a second anchor line 57 may be connected at one of its ends to the axle structure 28 of the turbine wheel 22 and connected at its other end to an anchor 59. The second anchor line 57 may be made of materials the same as or similar to those described above for the first anchor line. The second anchor 59 may be any device that resists movement, including stationary structures such as piers, buoys, conventional anchors, and other devices suitable for holding the wind turbine assembly in its predetermined position, including but not limited to those described above for the first anchor. Typically, if the anchor line is to be connected to a submerged anchor, the anchor line should be long enough to have a length to height ratio of at least about seven to one.

The connection of the second anchor line 57 to the axle structure 28 of the turbine wheel 22 is at the center of the wind forces applied to the turbine wheel. The centered connection of the anchor line to the turbine wheel provides a balanced longitudinal support for the wind turbine, directly opposite to the direction of the on-coming wind 37, and relieves force otherwise applied by the turbine wheel to the tower structure that extends from the turbine wheel to the floatable support. Since the turbine wheel usually is centered over an intermediate portion of the floatable support, the restraining forces applied by the anchor line to down-wind movement of the wind turbine assembly tend to maintain the wind turbine assembly in its upright attitude and facing the oncoming atmospheric wind. The connection of the anchor line 57 to the axle structure is at the upper end portion of the tower assembly 32 opposes and resists the longitudinal forces applied by the oncoming wind forces that are being applied to the wind turbine wheel 22. Thus, the force applied by the anchor line resists the tipping of the tower 32 and allows the tower structure to be less strong, less expensive and lighter than would be required without the anchor 59 and anchor line 57.

FIG. 6 shows a modified form of the turbine wheel. Turbine wheel 64 includes an outer rim 66 and an intermediate rim 68, both rims being circular and concentric with the axis of rotation of the turbine wheel. A plurality of inner sail wings 70 extends between the axle structure and the intermediate rim 68, and a plurality of outer sail wings 72 extends between the intermediate circular rim 68 and the outer circular rim 66. The pitch of the outer sail wings 72 typically will be different from the pitch of the inner sail wings 70 since the circular velocity of the outer sail wings is greater than the circular velocity of the inner sail wings. Also, the use of the intermediate circular rim 68 stabilizes the inner and outer sail wings so that the total length of the inner and outer sail wings 70 and 72 may be greater than the length available on a single set of sail wings.

As shown in FIGS. 2, 3, and 5, the axle structure 28 of the turbine wheel is of greater thickness than the circular perimeter rim 26. A plurality of spokes 76 extend from the ends of the axle structure 28 outwardly and converge into a supporting relationship with respect to the circular perimeter rim 26. This provides lateral and radial stability to the circular perimeter rim 26.

Figure 9:
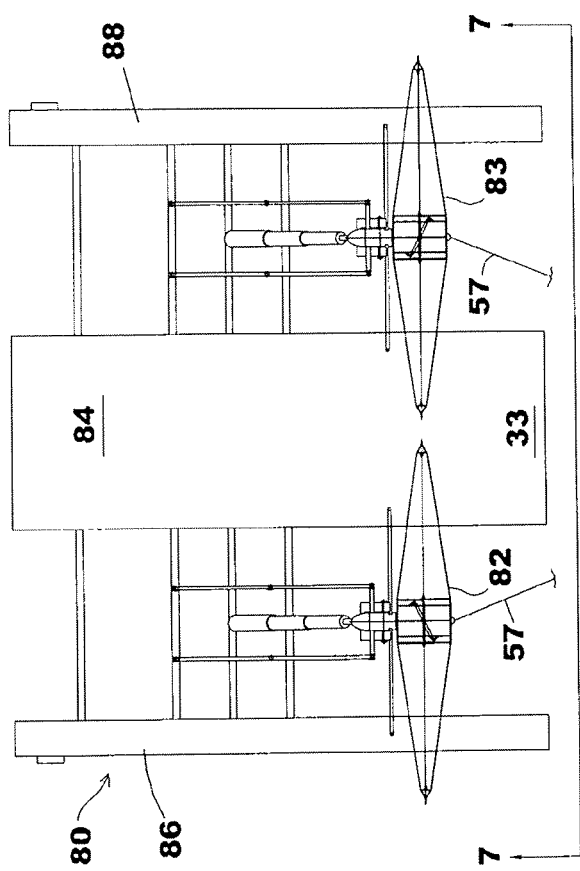
FIG. 9 is a top view of the double wind turbine of FIG. 6.
Figure 7:
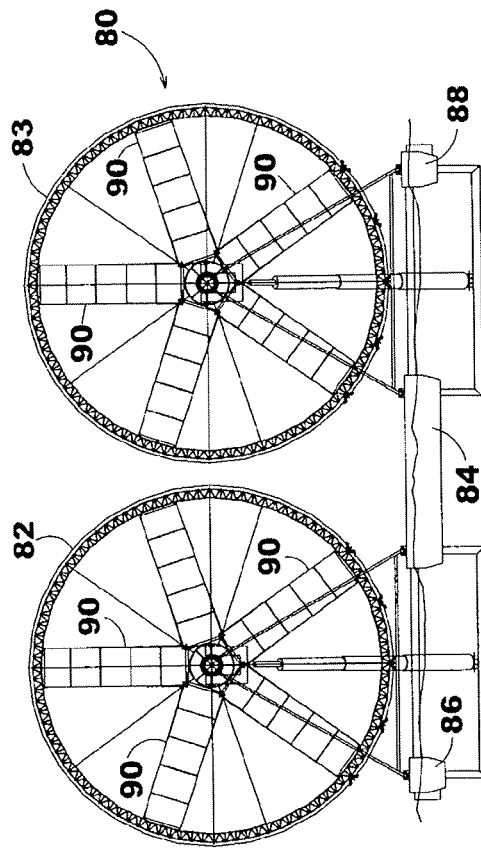
FIG. 7 is a front elevation view of a double wind turbine, having a pair of wind turbine wheels mounted on a common floatable support.
Figure 8:
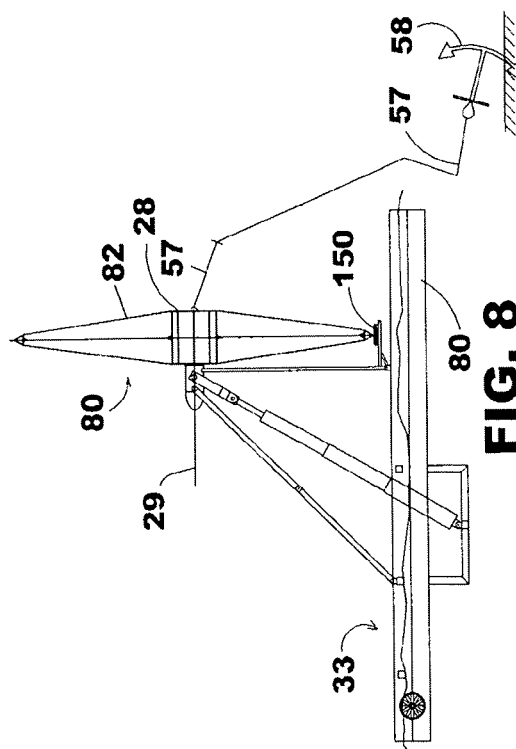
FIG. 8 is a side elevation view of the double wind turbine of FIG. 6.

FIGS. 7-9 show a wind turbine assembly 80 that is a "twin" assembly of the wind turbine assembly of FIGS. 1-5, that includes turbine wheels 82 and 83 that are substantially identical to the turbine wheel 22 of FIGS. 1-5. The floatable support 33 is modified so as to provide a central pontoon 84, with parallel outer pontoons 86 and 88, all pontoons supporting the turbine wheels as described in connection with FIGS. 1-5.

The sail wings 90 of one turbine wheel 82 may be oriented with a pitch so that the atmospheric wind will rotate the turbine wheel in a clockwise direction, whereas the sail wings 90 of the other turbine wheel 83 are oriented at a reverse pitch from that of the turbine wheel 82. This causes the turbine wheels to rotate in opposite directions when facing the oncoming atmospheric wind. This tends to neutralize the gyroscopic effect of the rotation of the turbine wheels of the twin wind turbine assembly 80.

Figure 10:
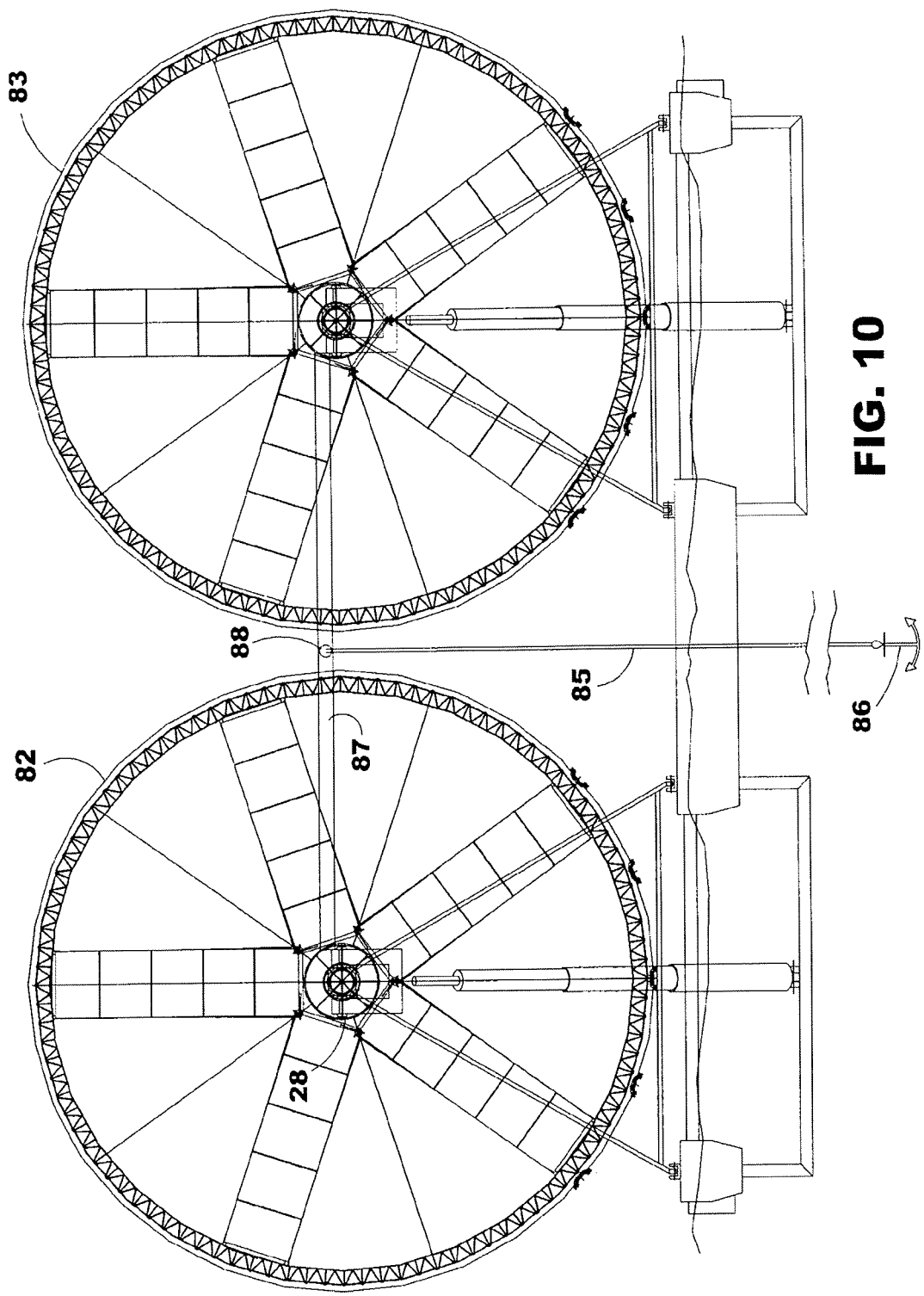
FIG. 10 is a front elevation view of a double wind turbine similar to FIG. 7, but including a modified anchoring structure.

FIGS. 10 and 11 show a twin wind turbine assembly, similar to FIGS. 7-9, but having the anchor line 85 connected at its distal end to the anchor 86 and connected at its proximal end to a horizontal cross brace 87 that functions as a horizontal tower. The horizontal cross brace 87 is connected at its end portions to the housing of the axle structure 28 of each turbine wheel. A rigid connector 88 is connected at one of its ends to the horizontal brace 87 and extents forwardly between the turbine wheels 82, 83 and connects to the more flexible anchor line 85. This avoids contact between the more flexible anchor line 85 and the turbine wheels 82, 83. This places the longitudinal support applied by the anchor 86 and anchor line 85 at the axial center of the turbine wheels, at the desired mid-height of the turbine wheels, above the base of the tower, where the force applied by the anchor is centered at the axle structure of each turbine.

Figure 12:
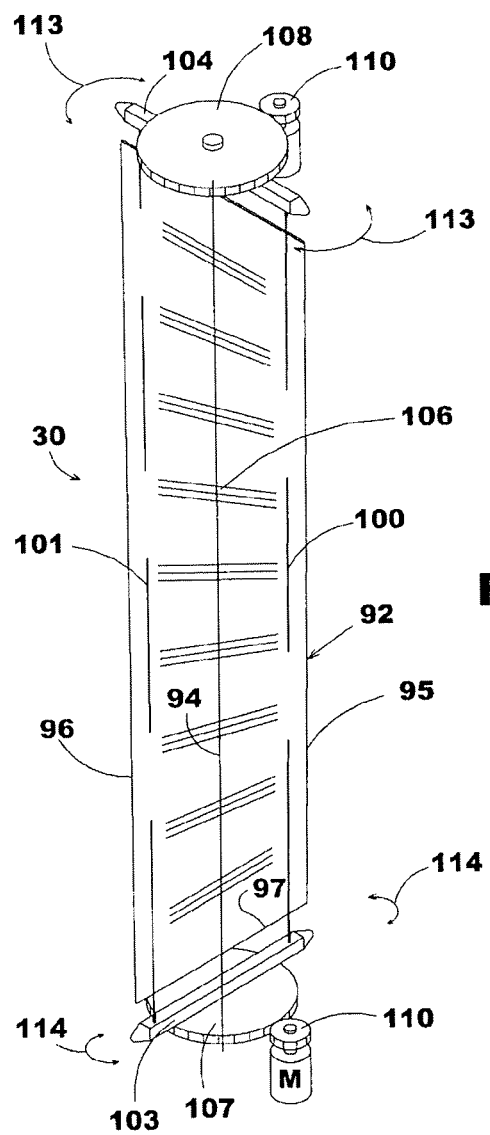
FIG. 12 is an isolated view of one of the wind sails of the wind turbines of FIGS. 1-8.
Figure 13:
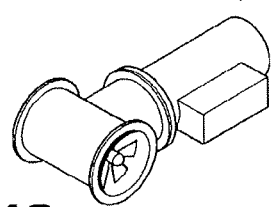
FIG. 13 is a perspective view of a lateral thruster that is mounted to the floatable support of FIGS. 1-8.
Figure 14:
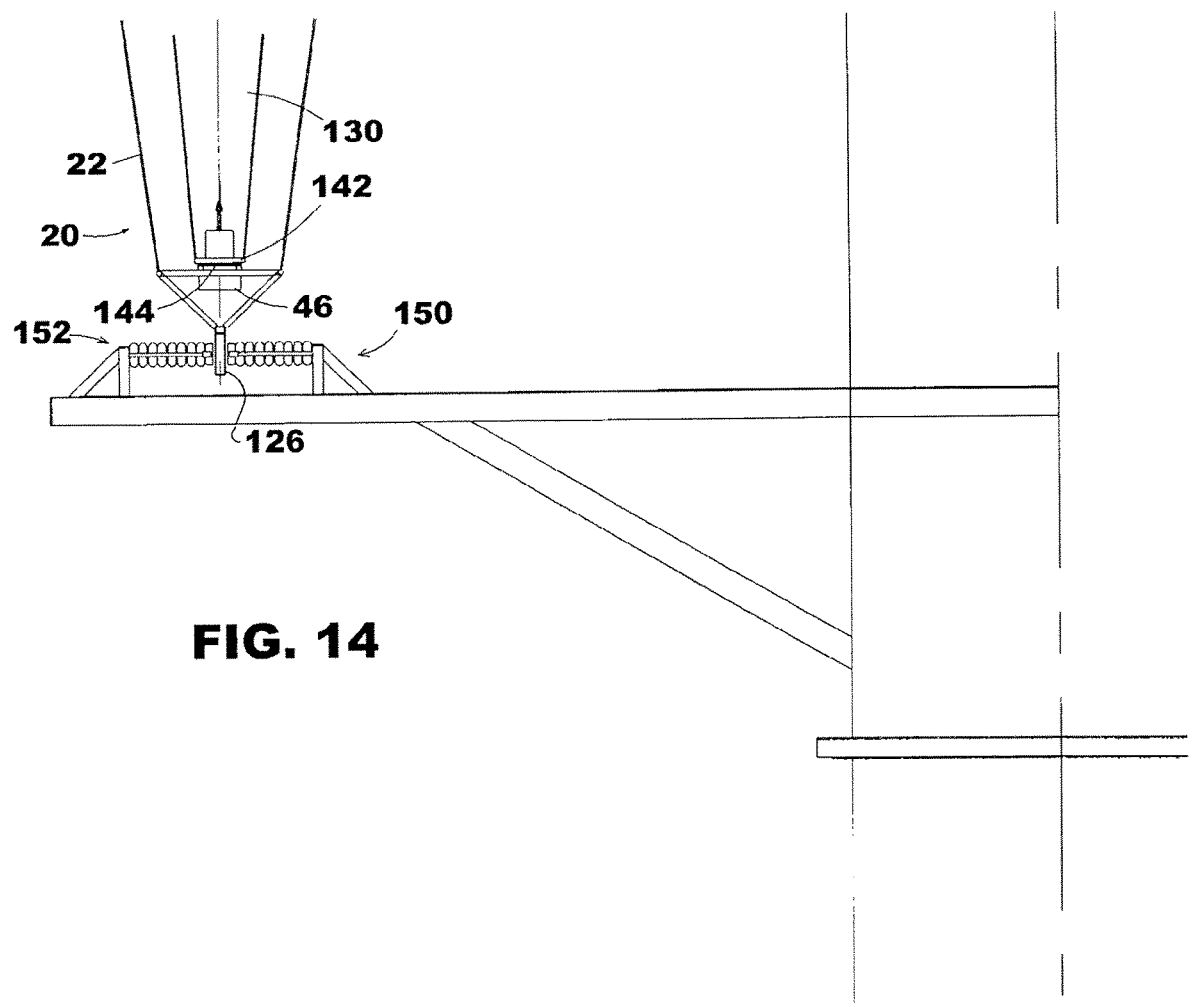
FIG. 14 is a side view of a turbine wheel, the type shown in FIGS. 1-8, but showing more details of the lower portion of the rotor and stator of the wind turbine.

FIG. 12 shows one of the sail wing assemblies 30. The sail wing assembly includes a sail wing 92 formed of a flexible material, such as sail cloth or thin fiberglass or other material that is able to bend when formed in an elongated shape. The sail wing 92 includes a longitudinal axis 94, opposed side edges 95 and 96, and inner and outer ends 97 and 98. Support cables 100, 101 extend through the sail wing 92 adjacent the opposed side edges 95 and 96, and extend through the inner end and outer end of the sail wing.

The shape control means are positioned at the ends of the sail wing 92. The shape control means includes a laterally extending end support 103 at the inner end 97 of the sail wing 92 and a similar laterally extending end support 104 at the outer end 98 of the sail wing. The laterally extending end supports 103 and 104 are connected at their ends to the support cables. The laterally extending end supports 103 and 104 are rotatable about their mid-lengths which are aligned with the longitudinal axis 94 of the wind sail, as indicated by arrows 113 and 114. The rotation of the laterally extending end supports causes the ends of the cables 100 and 101 to be rotated about the longitudinal axis 94 of the sail wing 92. When the ends of the cables are rotated in the same direction, the sail wings develop a pitch for catching the atmospheric wind. When the cables are rotated in opposite directions, the sail wings develop a twist along the length of the sail wing.

The material of the sail wing 92 can be made stronger or weaker at different intervals along its length, typically by reducing the density of the material of the sail wing in certain areas. This allows the sail wing to twist more at the weakened areas than at the stronger areas. For example, the area designated at 106 is a weakened area so that when the outer end 98 is turned with respect to the inner end 97, the sail wing is twisted. The sail wing tends to twist more in the weakened area 106 than in its strong areas, allowing for a variable pitch to be formed along the length of the sail wing.

As shown in FIG. 12, the laterally extending end support 104 at the outer end of the sail wing is connected to the slewing ring 108 that is connected in turn to the angle braces 24 (FIGS. 1-5) at the perimeter rim of the turbine wheel, and a motor driven gear 110 may engage the slewing ring and control the rotary movement of the laterally extending end support 104. A similar laterally extending end support 103 is connected to a slewing ring 107 at the inner axle structure 28, and the motor driven gear 110 may function to rotate the laterally extending wing support 103.

With this arrangement, the slewing rings 107 and 108 and the laterally extending end supports 103 and 104, and the support cables 100 and 101 function as shape control means for adjusting the pitch and twist of each of the sail wings. The shape control means may function to impart a longitudinal twist to the sail wings.

As shown in FIGS. 1, 2 and 5, at least one electrical generator 170 is positioned at the lower arc of the circular perimeter rim of the turbine wheel. The rotary movement of the circular perimeter rim is used to develop electrical power.

Figure 15:
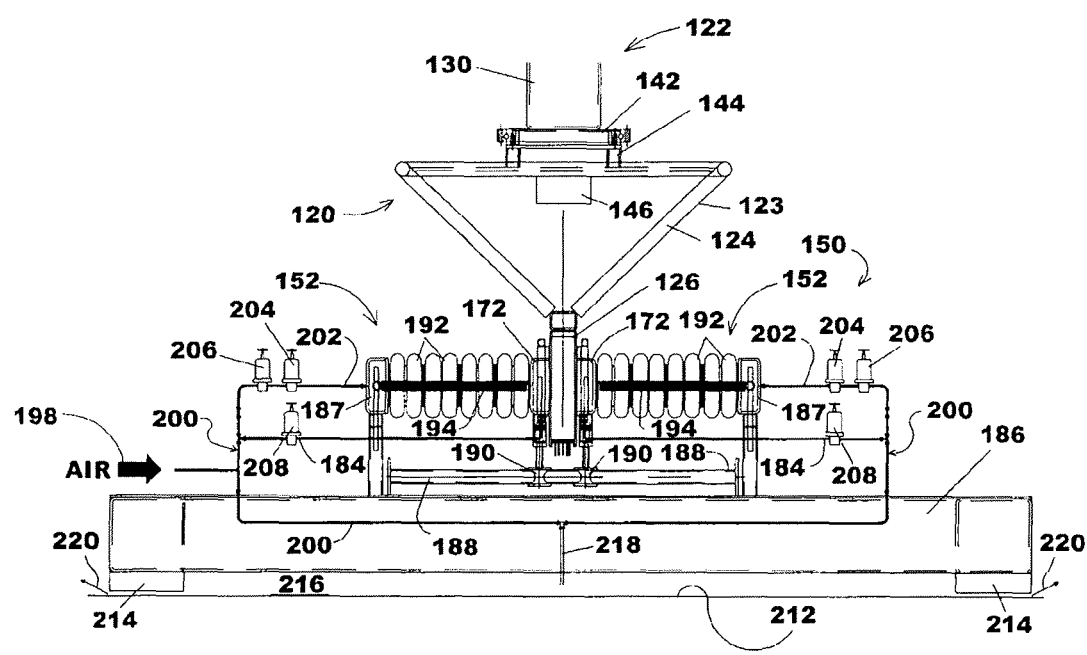
FIG. 15 is a side elevation view of the electrical generator of FIG. 11, showing more details of the electrical generator.
Figure 16:
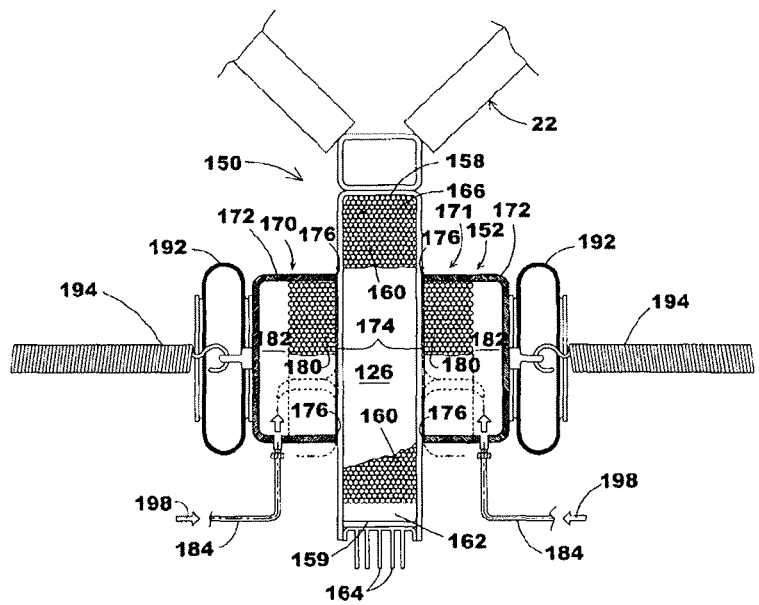
FIG. 16 is a close-up, cross sectional view of a portion of the rotor and stator of the electrical generator of FIGS. 12 and 13, showing the outer perimeter rim of the turbine wheel that functions as a rotor of the generator at the bottom of its circular path, and showing the central portion of the stator.

One type of electrical generator 150 is illustrated in FIGS. 14-17 of the drawings. The outer perimeter circular rim 126 of the turbine wheel 22 functions as the rotor of the generator. As shown in FIGS. 15 and 16, a stator assembly 172 is mounted at the perimeter of the turbine wheel 122 and is positioned to receive the outer perimeter circular rim 126 that functions as the rotor of the generator. The rotor 126 is formed in arcuate segments about the perimeter of the turbine wheel, and each arcuate segment of the rotor includes its own coils 160.

Figure 17:
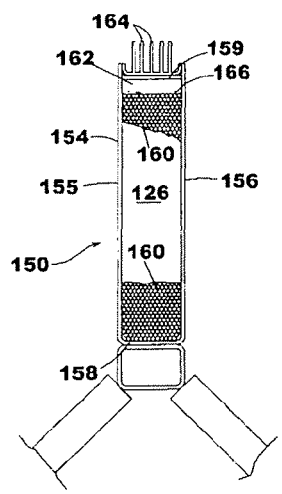
FIG. 17 is a cross-sectional view of the rotor inverted from FIG. 4.

As shown in FIG. 17, the rotor segments each includes an enclosed housing 154 having flat opposed side walls 155 and 156, inner end wall 158, and outer end wall 159. The electrical coils 160 are positioned in the closed housing with a space 162 formed between the coils 160 and the outer end wall 159. Cooling fins 164 extend from the outer end wall 159 for strength and for the purpose of extracting heat from the rotor 126. Also, a cooling liquid, such as oil 166, occupies some of the space about the coils 160. The cooling liquid 166 may not completely fill the inside of its rotor segment, leaving a space inside the rotor segment. As the turbine wheel rotates, the segments of the rotor 126 will be inverted with FIG. 16 showing a segment of the rotor at the lower arc of its rotation, and FIG. 17 showing a segment of the rotor when it is passing over the upper arc of its rotation. The cooling liquid 166 is influenced by gravity and by centrifugal force to move within the interior of the rotor 126, making contact with the coils and with the interior facing surfaces of the opposed side walls 155 and 156 and the interior facing surfaces of the inner end wall 158 and outer end wall 159. This tends to transmit the heat of the coils to the walls of the rotor, so as the rotor moves away from and then back towards the stator, the cooling fins 164 and the external surfaces of the walls of the rotor tend to shed their heat.

As shown in FIG. 16, stator 152 includes stator halves 170 and 171 that are positioned on opposite sides of the path of the rotor 126 as the rotor rotates on the turbine wheel 122. Stator halves 170 and 171 may be substantially identical and each includes a substantially cup-shaped stator housing 172 having its opening 174 facing the opposed side walls 155 and 156 of the rotor 126. The edges 176 about the cup-shaped stator housings each have a flat rim facing the rotor, the rims are shaped for forming the air escaping from the stator housings into a film of air between each stator housing and the rotor, such that an air bearing is formed between the stator housings and the rotor. The air bearing reduces the friction between the rotor and the stators.

The coils 160 of the stator halves are maintained in a juxtaposition with the rotor 126 by the stator housings 172.

A space 182 is formed in the cup-shaped stator housing behind the stator coils 180, with the space forming an air passage for the movement of air through the coils of the stator. An air conduit 184 communicates with the space 182 of each stator housing 172 to supply air 198 to the air passages 182, 184 behind the stator coils 160 so that the air moves from the air source 198 and through the air passage 182 through the stator coils 180, cooling the stator coils. After the air moves through and about the stator coils the air passes between the flat face of the rotor 126 and edges 176 of the cup-shaped stator housing 172. As the air passes the edges 176 of the cup-shaped stator housings 172, the air forms an air bearing between the stator housings 172 and the facing surfaces of the rotor 126. The air moving from the edges of the stator housings forms the air bearing against the flat facing surfaces of the rotor 126 that assures that the stator housings will not frictionally engage the surfaces of the rotor.

The turbine wheel may be of very large diameter, in excess of 100 feet in diameter. When the turbine wheel of such great size is rotated, it is likely that the rotor segments 126 will not follow exactly the same paths, such that the rotor segments may experience a lateral wobbling motion as they move through the stators, and/or move shallower or deeper into the stator assembly 172. Because of the likelihood of this movement, it is desirable to have the stator move laterally in response to the lateral motions of the rotor, and it is desirable to have the rotor built with a height that is greater than the height of the stator so that the stator can always be in the electrical field of the coils of the rotor.

As shown in FIG. 15, in order to accommodate the likely lateral motion of the rotor 126, the stator assembly 152 includes a support platform 186, with a support frame having stator support rails 188 mounted on the support platform. The stator housings 172 are mounted on the support rails 188 by means of rollers, such as rollers 190 that may travel along the stator support rails 188. Inflatable bellows 192 are positioned on the closed sides of the stator housings 192. The bellows 192 are in the shape of air bags connected at one end each to a stator housing 192 and supported at the distal ends by the support frame 187 of the stator. When the bellows 192 are inflated, they urge the stator housings 192 toward engagement with the rotor 126, with the air bearing at the edges of the stator housings helping to avoid the stator housings from contacting the rotor. Equal pressures are maintained in the inflatable bellows 192 on both sides of the stator housings so that when the rotor moves laterally, the bellows tend to urge the stators in the same lateral direction of movement of the rotor. Thus, the air bags function as a first biasing means engaging said stator housings for urging said stators toward said rotor.

In order to assure that the stators will relieve their force towards the rotor at times when the generator is to be deactivated, coil tension springs 194 extend from the lateral support structure 187 to the stator housings 172, tending to urge the stator housings away from the rotor. Thus, the springs function as a second biasing means engaging said stator housings for urging said stators away from said rotor.

FIG. 15 illustrates the air supply system for the stator assembly 152. An air supply device of conventional design (not shown) communicates with the air conduit system 200. The pressurized air 198 flows to the inflatable bellows 192 through conduits 202 at opposite ends of the stator, through an air pressure regulator 204, and an air pressure release valve 206, to the series of bellows 192. The air pressure to the bellows is regulated by the air pressure regulators 204 to apply the stator housings 192 towards the rotor 126, with equal pressure applied to the bellows on both sides of the rotor.

Air pressure relief valves 206 function to discharge the air from the bellows 192 when the air pressure drops below a predetermined value. This allows springs 194 to move the stator housings away from the rotor when air pressure is depleted.

Likewise, the air pressure control valves 208 control the movement of air through conduit 184 to the stator housings 192 as previously described. This maintains the cooling of the stator coils and establishes the air bearing at the edges of the cup-shaped stator housings with respect to the facing surfaces of the rotor 126.

Figure 22A:
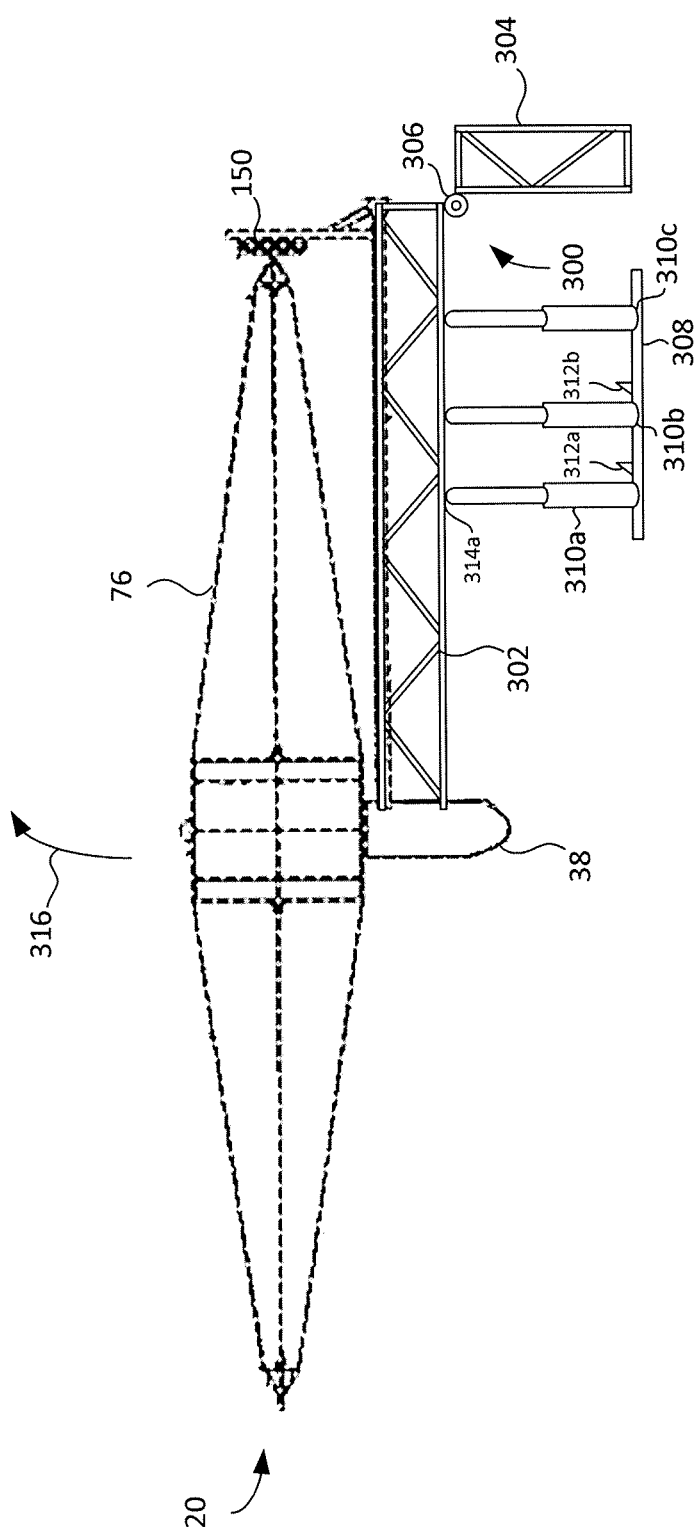
FIGS. 22A through 22C are side elevation views of aspects of the invention.

Referring to FIG. 22A, the mast assembly shown generally as 300 can include an upper support structure 302 hingeably connected to a lower support structure 304 by support structure hinge 306. The upper support structure, shown in the lowered position, can support the electrical generator 150 and the bearing housing 38. A base platform 308 can be included and can be attached to the lower support structure, independent of the lower support structure or removably attached to the lower support structure. The base platform can have attached to it one or more lifts such as hydraulic lifts 310a through 310c.

When the upper support structure is in the horizontal position, the force needed to lift the support structure is the greatest as the gravity vector is generally vertical in relation to the ground or platform supporting the base platform and lower support structure. To account for the gravity vector change as the support structure is erected, the first hydraulic lift can be disposed closers to the bearing housing to provide initial lifting from closer to the load of the support structure and attached components such as the bearing housing and load of the wind turbine on the mast support. A second hydraulic lift can be disposed between the first hydraulic lift and the lower support structure. In one embodiment, a third hydraulic lift can be positioned generally near the lower support structure so that the second hydraulic lift is disposed between the first and third hydraulic lifts.

The first hydraulic lift disposed closest to the bearing housing can include a roller on its distal end 314a that can contact the upper support structure and as the first hydraulic lift extends, it can roll along the upper support structure forcing the upper support structure to rotate in a direction shown as 316 about the support structure hinge to move into an operation position. The second hydraulic lift and third hydraulic lift also can apply upward force in conjunction and cooperation with the first hydraulic lift to raise the upper support structure. The first hydraulic lift can rotate about the base platform to generally maintain an orthogonal orientation un relation to the upper support structure.

Figure 22B:
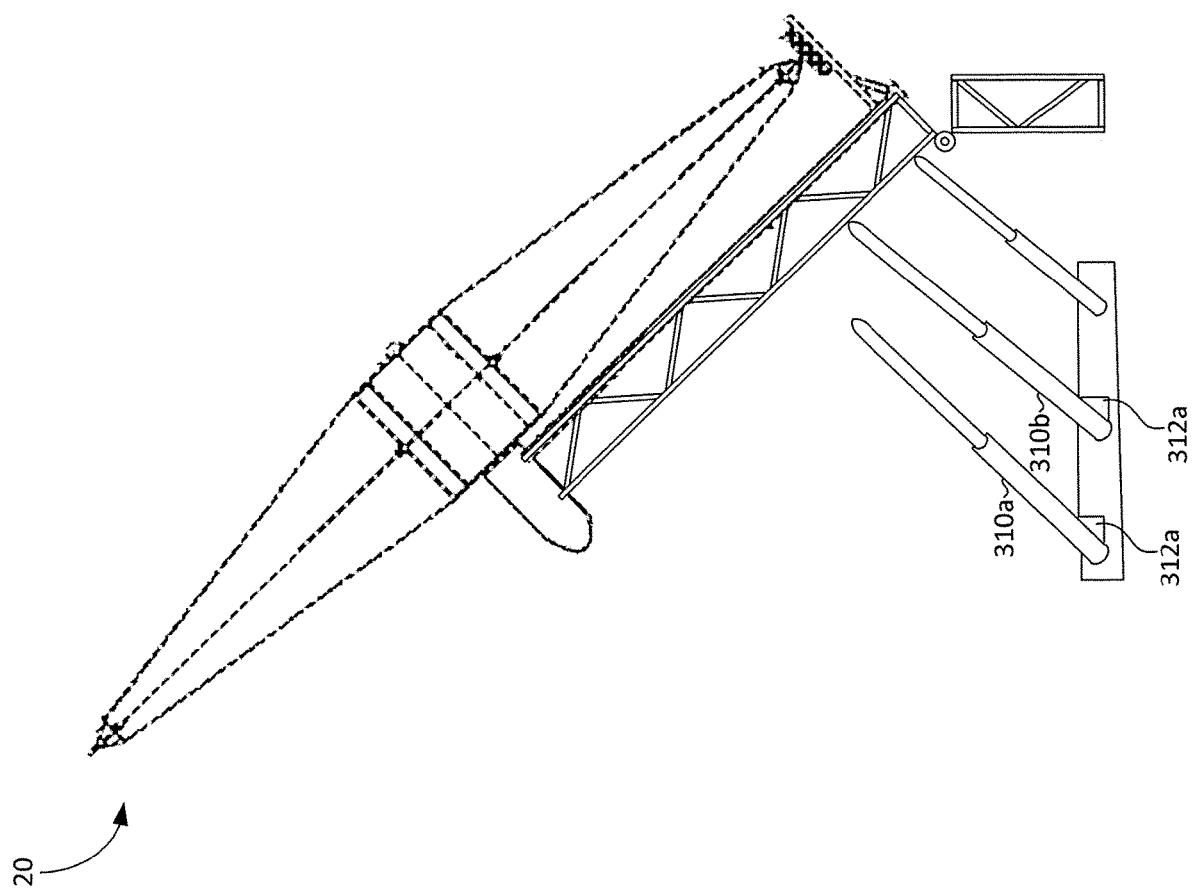

Referring to FIG. 22B, the mast assembly is shown transitioning from a construction/maintenance position to an operational position. The first hydraulic lift has completed lifting the upper support structure to a certain height and once it reaches generally is full extension length, loses contact with the upper support structure as the upper support structure continues to be lifted by the second or third or both hydraulic lifts. As the first hydraulic lift can be rotatably attached to the base platform and as it losses contact with the upper support structure it can contact a first stop 312a preventing it from rotating into the adjacent hydraulic lift.

The second hydraulic lift 310b can also loses contact with the upper support structure as the mast assembly is erected and can also be prevent from rotating into the adjacent lift by stop 312b. As the upper support structure is erected, the force gravity force vectors shift from generally vertical in the installation/maintenance position to generally vertical in the operational position. In the transition as the gravity force vector transitions, less upward force is needed rotate the upper support structure so that the transition can be accomplished with less lifts as each lift loses contact with the upper support.

Figure 22C:
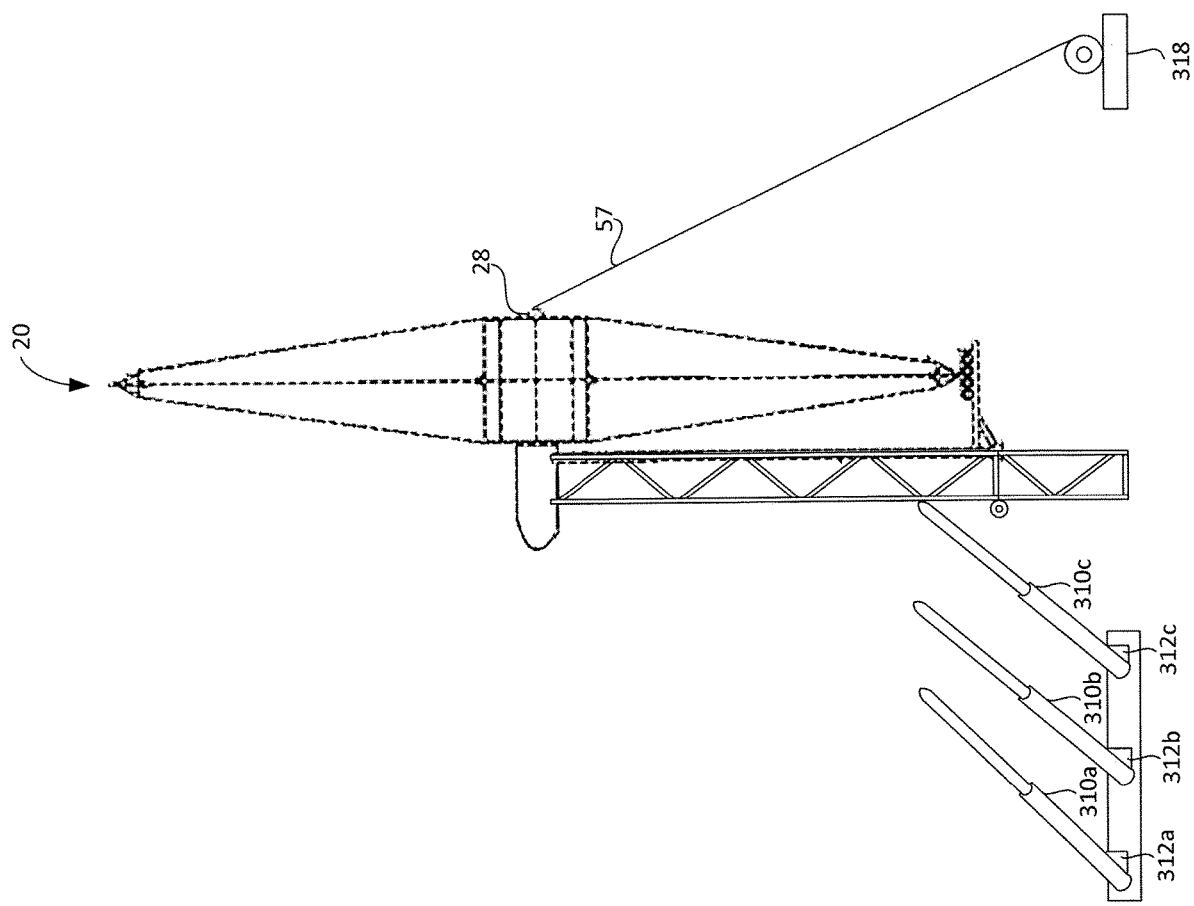

Referring to FIG. 22C, the mast assembly is shown in the operational position. The third hydraulic lift is shown in contact with the upper support structure to support the mast assembly in the operational position. The third hydraulic lift 310c can also lose contact with the upper support structure when the mast assembly is in the operation position. In this embodiment, the third hydraulic lift can contact a third stop 312c to prevent the lift from contact the mast assembly when contact is lost. A anchor line 57 can be attached to the axle structure 28 to assist in holding the mast assembly in the operational position. The anchor line can be attached to a winch 318 or other anchor assembly. The winch or other anchor assembly can be attached to the lower support structure, separate from the lower support structure or removable attached to the lower support structure. The winch can also be used to assist in transitioning the mast assembly between its various positions.

While it is anticipated that the above described adjustable positioning features of the stator will be sufficient to have the stator housings accurately follow the lateral movements of the rotor, the air from the air source 198 also may be used to form an air bearing between the support platform 186 and its support surface 212. The perimeter of the support platform 186 is formed with a downwardly extending rim 214 that forms a closed space 216 between the bottom surface of the support platform 186 and the upwardly facing surface 212 of the support. Air is moved through the downwardly extending conduit 218 to the space 216, generating enough upward force to lift the support platform, thereby forming spaces beneath the perimeter rim 214 with the movement of escaping air 220. The escaping air 220 forms an air bearing beneath the support platform 186, allowing the support platform to move in a lateral direction, following the lateral motions of the rotor 126.

Figure 18:
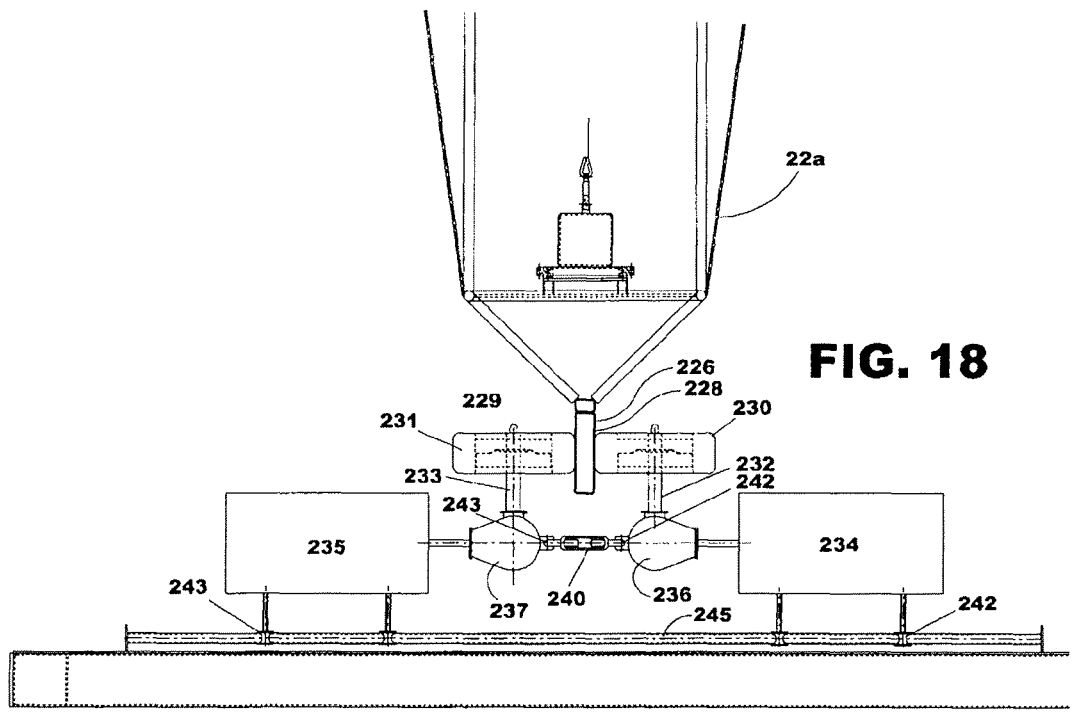
FIG. 18 is a close-up of another detail view of an electrical generator, showing the outer perimeter rim that drives the generator through paired wheels that engage the perimeter rim of the wind turbine.

FIG. 18 shows another type of electrical generator. The perimeter rim 226 of the turbine wheel includes opposed, laterally outwardly facing surfaces 228 and 229 that move in unison with the turbine wheel 22A. A pair of rotary members, such as rubber tires 230 and 231 are supported in engagement with the outwardly facing surfaces 228 and 229, respectively, of the perimeter rim 226. The tires are supported on axles 232 and 233, and the axles are connected to the electrical generators 234 and 235, respectively, through gear boxes 236 and 237. Turnbuckle 240 is connected at its opposite ends by bearings 242 and 243 to the axles 232 and 233, respectively. The turnbuckle is tightened so that the tires 230 and 231 make firm and resilient engagement with opposed surfaces of the perimeter rim 226 of the turbine wheel.

The electrical generators 234 and 235 are mounted on wheels 242 and 243, respectively, and the wheels engage rail 245.

It is anticipated that the diameter of the turbine wheel 20A shall be large, in some instances more than 100 feet in diameter. Because of the great size of the turbine wheel and because of slight lateral movement of the turbine wheel induced by intensity and direction of the atmospheric winds, the perimeter rim 226 is likely to move laterally, as well as in its circular path. The arrangement of the support system for the rotary members 230 and 231 is formed so as to compensate for the lateral movement. For example, if the perimeter rim 226 at its lower arc of FIG. 18 moves to the left of FIG. 18, the rotary members 230 and 231, as well as their attached components, including the gear boxes 236 and 237, turnbuckle 240, and electrical generators 234 and 235 are free to move to the left, by the rollers 242 and 243 moving along the rails 245. Likewise, movement to the right is accommodated in the same way.

FIGS. 19-21 show a double wind turbine 260, having a pair of wind turbine wheels 262 and 264 mounted on a common floatable support 266, and out riggers 268 that stabilize the floatable support. The out riggers 268 each include laterally extending support arms 270A-270F that support submerged sea anchors 272A-272F and their suspension lines 274.

When the floatable support 266 rolls, the lines connected to the sea anchors on the side of the floatable support that tilts downwardly tend to go slack while the lines connected to the sea anchors on the other side of the floatable support that tilts upwardly tend to resist upward movement. This tends to reduce the rolling of the floatable support and the wind turbine assemblies supported on the floatable support.

Although the sea anchors 272 and their riggings are disclosed in connection with the double wind turbines of FIGS. 19-21, it will be understood that the sea anchors may be used in connection with the single wind turbine assemblies such as shown in FIGS. 1-5 and 7-11, and in connection with other forms of this invention.

While the expression "electrical generator" has been used herein, it should be understood that this term may identify other rotary devices that may be driven by the wind turbines disclosed herein, such as alternators, pumps, etc.

While several drawing figures illustrate the turbine assemblies mounted on floatable supports, it should be understood that the structures disclosed herein may be used on wind turbine assemblies that are mounted on non-floating supports. For example, the second anchor line 57 may be used on land-mounted wind turbines, by connecting the anchor line to a ground anchor.

It will be understood by those skilled in the art that while the foregoing description sets forth in detail preferred embodiments of the present invention, modifications, additions, and changes might be made thereto without departing from the spirit and scope of the invention, as set forth in the following claims.

What is claimed is:

1. A wind turbine assembly for generating electricity, comprising:
  a mast assembly having an upper support structure hingably attached to a lower support structure wherein the mast assembly has an installation position and an operational position;
  a wind turbine carried by the mast assembly;
  a first hydraulic lift in contact with the upper support structure when the mast assembly is in the installation position and configured to transition the upper support structure from the installation position to the operational position and wherein the first hydraulic lift is configured to lose contact with the upper support structure during the transition;
  a second hydraulic lift in contact with the upper support structure disposed adjacent to the first hydraulic lift when the mast assembly is in the installation position and configured to transition the upper support structure from the installation position to the operational position and wherein the second hydraulic lift is configured to lose contact with the upper support structure after the first hydraulic lift loses contact with the upper support structure during the transition; and,
  a third hydraulic lift in contact with the upper support structure disposed between the second hydraulic lift and the lower support structure when the mast assembly is in the installation position and configured to transition the upper support structure from the installation position to the operational position.

2. The wind turbine assembly of claim 1 including an electrical generator operatively connected to said wind turbine for generating electricity in response to a rotational movement of said wind turbine.

3. The wind turbine assembly of claim 1 wherein the third hydraulic lift is configured to lose contact with the upper support structure after the first and second hydraulic lifts lose contact with the upper support structure during the transition to the operational position.

4. The wind turbine assembly of claim 3 wherein said first, second and third hydraulic lifts are rotatably attached to a base platform.

5. The wind turbine assembly of claim 3 including a first stop operatively associated with the first hydraulic lift, a second stop operatively associated with the second hydraulic lift, and a third stop operatively associated with the third hydraulic lift, wherein the first, second and third stops are configured to limit rotation of the respective hydraulic lift after contact of each said hydraulic lift is lost with the upper support structure.

6. The wind turbine assembly of claim 1 including an anchor line attached to said wind turbine to assist in holding the mast assembly in the operational position.

7. The wind turbine assembly of claim 6 including a winch operatively associated with said anchor line to assist in transitioning the mast assembly between the installation position and the operational position.

8. A wind turbine assembly for generating electricity, comprising:
   a mast assembly having an installation position and an operational position;
   a wind turbine carried by the mast assembly;
   an electrical generator operatively connected to said wind turbine for generating electricity in response to a rotational movement of said wind turbine; and,
   a plurality of hydraulic lifts in contact with the mast assembly when the mast assembly is in the installation position and configured to transition the mast assembly from the installation position to the operational position and wherein at least one of said hydraulic lifts loses contact with the mast assembly during the transition; and,
   at least one stop operatively associated with the hydraulic lifts to limit rotation of at least one of said hydraulic lifts after contact is lost between the mast assembly and at least one of said hydraulic lifts.

9. The wind turbine assembly of claim 8 wherein said mast assembly includes an upper support structure hingably attached to a lower support structure.

10. The wind turbine assembly of claim 8 including an anchor line attached at a first end to said wind turbine and to an anchor at a second end, wherein the anchor line is configured to assist in holding the mast assembly in the operational position.

11. The wind turbine assembly of claim 10 wherein the anchor is a winch.

12. The wind turbine assembly of claim 11 wherein the winch is configured to assist with the transition of the mast assembly from the installation position to the operational position.

13. The wind turbine assembly of claim 8 wherein said plurality of hydraulic lifts include a first hydraulic lift, a second hydraulic lift, and a third hydraulic lift each rotatably attached to a base platform, wherein the first, second and third hydraulic lifts are configured to sequentially lose contact with said mast assembly during the transition to the operational position.

14. A wind turbine assembly for generating electricity, comprising:
   a mast assembly having a lowered installation position and a raised operational position;
   a wind turbine carried by the mast assembly;
   a first, second and third hydraulic lift each in contact with the mast assembly in the installation position and configured to transition the mast assembly from the installation position to the operational position, wherein the first, second and third hydraulic lifts are configured to sequentially lose contact with the mast assembly during the transition.

15. The wind turbine assembly of claim 14 including an electrical generator operatively connected to said wind turbine for generating electricity in response to a rotational movement of said wind turbine.

16. The wind turbine assembly of claim 14 including an anchor line attached at a first end to the wind turbine and to an anchor at a second end, wherein the anchor line is configured to assist in holding the mast assembly in the operational position.

17. The wind turbine assembly of claim 14 including a first stop operatively associated with the first hydraulic lift, a second stop operatively associated with the second hydraulic lift, and a third stop operatively associated with the third hydraulic lift, wherein the first, second and third stops are configured to limit rotation of the respective hydraulic lift after contact is lost between the mast assembly and the respective hydraulic lift.

\* \* \* \* \*